United States Patent [19]

Sullivan

[11] Patent Number: 5,380,816

[45] Date of Patent: Jan. 10, 1995

[54] LINEAR POLYESTER DIOLS BASED ON ISOPHTHALIC ACID AND 2-METHYL-1,3-PROPANEDIOL FOR THERMOSET COATING COMPOSITIONS

[76] Inventor: Carl J. Sullivan, 315 Colonial Dr., Exton, Pa. 19341

[21] Appl. No.: 695,048

[22] Filed: May 2, 1991

Related U.S. Application Data

[60] Division of Ser. No. 610,500, Nov. 7, 1990, which is a continuation-in-part of Ser. No. 350,491, May 11, 1989, abandoned.

[51] Int. Cl.$^6$ .............................................. B05D 3/02
[52] U.S. Cl. .................................. 427/385.5; 528/272; 528/289; 528/302; 528/332; 528/363; 525/437; 525/441; 428/482; 427/372.2; 427/384; 427/385.5
[58] Field of Search ............... 528/272, 289, 302, 332, 528/363; 525/437, 441; 428/482; 427/372.2, 384, 385.5

[56] References Cited

U.S. PATENT DOCUMENTS

| | | | |
|---|---|---|---|
| 3,691,258 | 9/1972 | Riemhofer et al. | 525/443 |
| 3,804,920 | 4/1974 | Cunningham et al. | 525/443 |
| 4,140,729 | 2/1979 | Tobias et al. | 524/539 |
| 4,229,555 | 10/1980 | Tobias et al. | 525/443 |
| 4,237,244 | 12/1980 | von Harpe et al. | 525/171 |
| 4,381,379 | 4/1983 | Toga et al. | 525/444 |
| 4,393,121 | 7/1983 | Tobias et al. | 428/458 |
| 4,396,746 | 8/1983 | Toga | 525/444 |
| 4,404,333 | 9/1983 | Watanabe et al. | 525/437 |
| 4,415,727 | 11/1983 | Toga et al. | 528/272 |
| 4,436,896 | 3/1984 | Okamoto et al. | 156/332 |
| 4,520,188 | 5/1989 | Holzrichter et al. | 578/274 |
| 4,521,571 | 6/1985 | Ishido et al. | 525/437 |
| 4,968,775 | 11/1990 | Toman et al. | 528/272 |

FOREIGN PATENT DOCUMENTS

| | | |
|---|---|---|
| 56-155223 | 12/1981 | Japan . |
| 59-91118 | 5/1984 | Japan . |
| 1429735 | 3/1976 | United Kingdom . |

*Primary Examiner*—Samuel A. Acquah

[57] ABSTRACT

Linear polyester diols suitable for the preparation of thermoset coatings having improved flexibility and hardness are disclosed. The linear polyesters consist essentially of recurring units of isophthalic acid, an aliphatic diol component including 2-methyl-1,3-propanediol, and optionally, a dicarboxylic acid other than isophthalic acid. The linear polyester diols are useful for thermosettable resin compositions that comprise the polyester diol, an aminoplast crosslinking agent, and a catalyst.

18 Claims, No Drawings

LINEAR POLYESTER DIOLS BASED ON ISOPHTHALIC ACID AND 2-METHYL-1,3-PROPANEDIOL FOR THERMOSET COATING COMPOSITIONS

This is a division, of application Ser. No. 07/610,500 filed on Nov. 7, 1990, which is a continuation-in-part of application Ser. No. 07/350,491, filed May 11, 1989, now abandoned.

FIELD OF THE INVENTION

The present invention relates to linear polyester resins suitable for use in coating applications. More specifically, the invention relates to linear polyester diols that contain recurring units of 2-methyl-1,3-propanediol and isophthalic acid. The linear polyester diols are useful in thermosettable coating compositions that contain an aminoplast crosslinking agent and a catalyst; the resin compositions may be cured to yield hard, yet flexible, coatings.

BACKGROUND OF THE INVENTION

The use of thermosettable resin compositions containing low molecular weight polyesters as protective coatings for substrates such as steel coil is known in the art. An ideal protective coating is one that adheres well to the substrate, is simultaneously hard and flexible, and resists solvents, abrasion, and dry heat. A combination of such properties in a polyester-based coating is ordinarily difficult to achieve because one property can often only be enhanced at the expense of another. For example, excellent coating flexibility is essential during substrate shaping, which normally follows coating application. High hardness is desirable for aesthetic reasons, and for greater durability and resistance to stains and solvents. Hardness may be enhanced by increasing the cyclic (i.e., the proportion of aromatic or cycloaliphatic recurring units) content of the polyester. However, a high cyclic content tends to result in inflexible or brittle coatings. Another way to increase hardness is to incorporate significant amounts of a polyol having three or more hydroxy groups into the polyester. The polyester is consequently highly branched rather than linear and tends to decrease the flexibility of the cured coating. Problems with premature gelation are sometimes also observed with such branched polyesters.

Ideally, polyesters are non-crystallizable and dissolve freely in common organic solvents. Resin compositions are normally applied in solution form in order to lower the viscosity of the neat polyester/aminoplast mixture. Since a polyester typically is stored for an extended period of time prior to application, it is important that the polyester not crystallize or precipitate out of solution. Increasing the cyclic content of a polyester to enhance the hardness of a cured coating, particularly if the dicarboxylic acid component is terephthalic acid, tends to increase the crystallizability of the polyester and to decrease its solubility in organic solvents.

The following representative coating patents illustrate the property trade-off dilemmas herein described.

U.S. Pat. No. 3,804,920 teaches the use of a blend of a high cyclic content polyester and a low cyclic content polyester in a resin coating composition.

U.S. Pat. No. 4,140,729 describes a resin composition containing a polyester with high cyclic content. Flexibility and non-crystallinity are provided by the incorporation of 1,6-hexanediol into the polyester.

U.S. Pat. Nos. 4,229,555 and 4,393,121 teach high cyclic content polyesters containing small amounts of an aliphatic dicarboxylic acid to enhance the flexibility of the cured resin composition.

U.S. Pat. No. 4,520,188 discloses a polyester comprised of neopentyl glycol, 1,4-cyclohexanedimethanol, aliphatic diacid, terephthalic acid, and at least one other aromatic dicarboxylic acid. This polyester gives coatings having a satisfactory overall balance of properties.

The above patents teach that it is desirable to have a high level of cycloaliphatic or aromatic diacid for linear polyesters because these acids contribute favorable hardness properties. Each of the above formulations suffers from the disadvantage of being complicated and/or derived from expensive components. The references overcome the crystallinity problem of linear, high-cyclic content polyesters either by using expensive flexibilizing diols such as 1,6-hexanediol and 1,4-cyclohexanedimethanol, or by including aliphatic diacids.

Japanese Kokai No. 59-91118 discloses polyester polyols containing 2-methyl-1,3-propanediol. The reference teaches that polyester polyols made using 2-methyl-1,3-propanediol are inexpensive and easily manufactured. The polyester polyols have low crystallinity and good solubility in curable compositions compared with polyesters derived from neopentyl glycol and the like. Branched polyesters derived from isophthalic acid, 2-methyl-1,3-propanediol, adipic acid, and either trimethylolpropane or pentaerythritol are illustrated. The polyesters of the examples have relatively low isophthalic acid contents of from about 28–36 mole percent. Linear polyesters diols derived from isophthalic acid are not shown, nor are polyesters having isophthalic acid contents of greater than about 40 mole percent.

Clearly, there is a need for linear polyester diol resin compositions that are easily prepared, solvent-stable, and non-crystallizable, especially at high isophthalic acid contents. There is also a need for coatings that are hard, non-brittle, glossy, and resist stains and abrasion.

SUMMARY OF THE INVENTION

This invention provides linear polyester diols suitable for use in preparing thermosettable resin coatings that have improved flexibility and hardness- The linear polyester diols of the invention consist essentially of (a) from about 40 to 55 mole percent of recurring units of isophthalic acid; (b) from about 45 to 60 mole percent of recurring units of an aliphatic diol, wherein from about 75 to 100 mole percent of said aliphatic diol recurring units are 2-methyl-1,3-propanediol; and (3) optionally, from about 0 to 15 mole percent of recurring units of a dicarboxylic acid moiety other than isophthalic acid. The combined acid and hydroxyl number of the linear polyester diol is from about 15 to 75 milligrams of potassium hydroxide per gram of linear polyester diol.

The linear polyester diols of this invention have the desirable advantage of having high aromatic diacid content without being crystallizable. The polyesters of the invention may thus be stored for extended times at relatively low temperatures without solidification or precipitation problems. Alternatively, the linear polyester may be comprised of (a) from about 40 to 55 mole percent of recurring units of a dicarboxylic acid, wherein from about 75 to 100 mole percent of said dicarboxylic acid moiety recurring units are recurring units of a cyclic dicarboxylic acid moiety and (b) from about 45 to 60 mole percent of recurring units of an aliphatic diol, wherein from about 75 to 100 mole percent of said aliphatic diol recurring units are 2-methyl-1,3-propanediol.

Additionally, this invention provides thermosettable resin compositions suitable for forming hard coatings with improved flexibility. The thermosettable resin compositions are comprised of the linear polyester diols of the invention, an amount of an aminoplast effective to crosslink the resin composition, and an amount of a catalyst sufficient to catalyze reaction of the linear polyester diol and the aminoplast. The resin composition may include an organic solvent and a pigment. When cured, the resin compositions of the invention are hard, durable, and stain-resistant; surprisingly, they are also quite flexible. The cured coatings will typically have a pencil hardness of greater than 2H, while passing a 0-T bend test and a 120 in/lbs. direct or reverse impact test. Excellent solvent compatibility and the combination of superior coating properties are surprising in view of the linear nature and high isophthalate content of the polyester diol.

DETAILED DESCRIPTION OF THE INVENTION

The linear polyester diols of the invention contain from about 40 to 55 mole percent of recurring units of isophthalic acid. Preferably, the amount of isophthalic acid recurring units is within the range of about 45 to 50 mole percent. The isophthalic acid units may be derived from isophthalic acid itself or any suitable condensation-polymerizable isophthalic acid derivative, for example isophthaloyl chloride, dimethyl isophthalate, diethyl isophthalate, and the like. Isophthalic acid is preferred. The dicarboxylic acid moiety in the alternative polyester described hereinabove may be derived from any suitable dicarboxylic acid derivative, provided that from about 75 to 100 mole percent of the dicarboxylic acid moiety is a cyclic dicarboxylic acid moiety. Depending on the method of polyester preparation selected, such compounds may comprise the parent diacid or the corresponding anhydride, ester, acid halide, or the like. The cyclic dicarboxylic acid moiety may be either an aromatic or cycloaliphatic dicarboxylic acid; aromatic dicarboxylic acids are preferred. Examples of suitable aromatic dicarboxylic acids which may be used in the alternative linear polyesters include phthalic acids such as isophthalic acid, terephthalic acid, and phthalic anhydride, as well as naphthalene dicarboxylic acids, diphenyl dicarboxylic acids, alkyl- or halo-substituted phthalic acids, and mixtures thereof. The most preferred aromatic dicarboxylic acid moiety is isophthalic acid. It is desirable that at least about 50 mole percent of the aromatic dicarboxylic acid moiety be isophthalic acid.

The cycloaliphatic dicarboxylic acids which may be used include, for example, cyclohexyl dicarboxylic acids and tetrahydrophthalic acids. Mixtures of aromatic and cycloaliphatic dicarboxylic acids may be employed.

The other dicarboxylic acid moiety which may be present in the alternative linear polyester at a level of from 0 to about 25 mole percent of the total dicarboxylic acid moiety content may be any noncyclic dicarboxylic acid or derivative. Examples of such dicarboxylic acids include linear aliphatic dicarboxylic acids such as adipic acid, glutaric acid, maleic acid, succinic acid, azelaic acid, and the like. Saturated linear dicarboxylic acids are preferred, particularly those containing from four to six carbon atoms. In general, increasing the proportion of linear aliphatic dicarboxylic acid tends to promote cured resin flexibility whereas increasing the proportion of cyclic dicarboxylic acid leads to improved hardness. Most preferably, only cyclic dicarboxylic acid moieties are present in the linear polyester.

The linear polyester diols of the invention also contain from about 45 to 60 mole percent of recurring units of an aliphatic diol. Preferably, the amount of aliphatic diol is within the range of about 50 to 55 mole percent. At least about 75 mole percent of the aliphatic diol recurring units are derived from 2-methyl-1,3-propanediol. This diol may be obtained by a number of synthetic routes. For example, hydroformylation/hydrogenation of allyl alcohol yields 2-methyl-1,3-propanediol in addition to 1,4-butanediol. The hydroxyl groups of 2-methyl-1,3-propanediol are primary, making condensation polymerization of this diol advantageously rapid. Similarly, polyester chains having terminal 2-methyl-1,3-propanediol groups react quickly with aminoplast crosslinking agents compared with polyesters that have secondary hydroxyl end groups. It is possible that the flexibility and high hardness of the cured resin compositions of this invention are partly due to the 1,3-arrangement of hydroxyl groups and branched structure of 2-methyl-1,3-propanediol.

Optionally, up to about 25 mole percent of the aliphatic diol component is a dihydroxy compound other than 2-methyl-1,3-propanediol. Any suitable aliphatic diol, especially those having up to six carbon atoms, may be used, including, for example: 1,2-diols such as ethylene glycol, 1,2-propylene glycol, and 1,2-butylene glycol; 1,3-diols such as neopentyl glycol, 1,3-propanediol, and 1,3-butanediol; 1,4-diols such as 1,4-butanediol; and other diols such as 2-methyl-1,3-pentanediol, 1,4-cyclohexanedimethanol, diethylene glycol, tripropylene glycol, and 1,6-hexanediol. In general, it is preferred that the molecular weight of the aliphatic diol be about 250 or lower. Mixtures of aliphatic diols may be used. Preferably, however, 2-methyl-1,3-propanediol is the only diol present in the linear polyester diols of the invention.

The linear polyester diols of the invention optionally contain up to about 15 mole percent of recurring units of a dicarboxylic acid moiety other than isophthalic acid. The dicarboxylic acid moiety may be derived from any suitable precursor, such as acid chlorides, anhydrides, dialkyl esters, and the like. The dicarboxylic acid moiety may be aromatic or aliphatic, as desired.

Examples of suitable aromatic dicarboxylic acid moieties that may be optionally used in the linear polyester diols of the invention include phthalic acid, terephthalic acid, phthalic anhydride, naphthalene dicarboxylic acids, biphenyl dicarboxylic acids, alkyl- or halo-substituted phthalic acids, and mixtures thereof.

suitable aliphatic dicarboxylic acid moieties include cycloaliphatic dicarboxylic acids such as cyclohexyl dicarboxylic acids, and tetrahydrophthalic acids, and linear aliphatic dicarboxylic acids such as adipic acid, glutaric acid, maleic acid, succinic acid, azelaic acid, and the like. Mixtures of aromatic and aliphatic dicarboxylic acids may be employed.

In general, increasing the proportion of linear aliphatic dicarboxylic acid tends to promote cured resin flexibility, while increasing the proportion of aromatic or cycloaliphatic dicarboxylic acid leads to improved hardness. In the most preferred embodiments of this invention, only aromatic or cycloaliphatic dicarboxylic acids moieties are present in the linear polyester.

Any of the methods known in the art for the condensation polymerization of aliphatic diols and dicarboxylic acids or dicarboxylic acid derivatives may be used to prepare the linear polyester diols of this invention. Suitable methods are described, for example, in G. Odian *Principles of Polymerization* 2nd Ed., John Wiley and Sons, New York, 1981, pp. 102-105, the teachings of which are incorporated herein by reference. The linear polyester diols may be produced by direct esterification of a dicarboxylic acid or dicarboxylic acid anhydride with an aliphatic diol, by reaction of a dicarboxylic acid halide with an aliphatic diol, or by transesterification of a dicarboxylic acid ester with an aliphatic diol. For reasons of economy and convenience, direct esterification is the preferred method.

Typically, one or more aliphatic diols, one or more dicarboxylic acids, and (optionally) a condensation catalyst are combined in a reaction vessel and heated to between about 100° C. and 280° C. (preferably, between about 180° C. and 250° C.). The condensation catalyst may be, for example, a protic or Lewis acid, a base such as calcium acetate, antimony trioxide, or titanium tetralkoxide, or an alkyl tin compound such as dibutyltin oxide, hydrated monobutyltin oxide, or dibutyltin dilaurate. The water produced as a by-product in the condensation reaction is preferably removed by distillation, either at atmospheric or reduced pressure. Any aliphatic diol removed overhead is preferably recycled to the reaction vessel. Xylene, toluene, or any other suitable organic solvent can be used to azeotropically remove water; this is particularly advantageous in the later stages of the condensation polymerization.

Condensation is continued until the desired viscosity, molecular weight, or combined acid and hydroxyl number is achieved. The linear polyester diols of this invention have a combined acid and hydroxyl number of from about 15 to 75 milligrams of potassium hydroxide per gram of linear polyester diol. The number average molecular weight is preferably within the range of about 1000 to 7500. In preparing the linear polyester, it is usually preferred to use an excess of the aliphatic diol so as to have more hydroxyl end-groups than carboxylic acid end-groups in the final product, and to compensate for certain side reactions involving the aliphatic diols that sometimes occur.

Any of the aminoplast crosslinking agents known in the art are suitable for use as the aminoplast component in the resin compositions of this invention. In general, suitable aminoplasts include urea-aldehyde resins, melamine-aldehyde resins, dicyandiamide-aldehyde resins, and triazine-aldehyde resins which have been alkylated with an alcohol such as methanol or butanol. Aldehydes useful for reacting with amino compounds to form the aminoplasts include, for example, formaldehyde, acetaldehyde, and acrolein, as well as aldehyde precursors such as paraformaldehyde and hexamethylenetetramine. Other examples of suitable aminoplasts are described in U.S. Pat. No. 3,804,920; the teachings of this patent are incorporated herein by reference in their entirety. A preferred class of aminoplasts are melamine derivatives having at least four

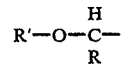

groups attached to the amino groups of the melamine structure, wherein R is hydrogen or a $C_1$-$C_5$ alkyl group and R' is a $C_1$-$C_6$ alkyl group.

Hexamethoxymethyl melamine is a particularly preferred aminoplast. The amount of aminoplast used should be sufficient to crosslink the resin composition and to provide a thermoset cured coating. Preferably, the amount of aminoplast used is within the range of about 1 to 35 weight percent of the total weight of the resin composition. More preferably, the amount used is within the range of about 5 to 20 weight percent.

Any catalyst capable of catalyzing the crosslinking reaction between the linear polyester diol and the aminoplast can be used in the resin compositions of the invention. Suitable catalysts include acid catalysts and metal salt catalysts. Typically, a suitable acid catalyst will have a $pk_a$ value of about 2 or less. The acid catalyst may be an acid or a derivative that will generate the acid in situ during curing. Examples of suitable acid catalysts include all of the acids generally used for curing aminoplast/polyester compositions, such as sulfonic acids (e.g., p-toluenesulfonic acid, benzenesulfonic acid, methylsulfonic acid), mineral acids (e.g., nitric acid, phosphoric acid), mono- or dialkyl phosphoric acids (e.g., butyl phosphoric acid), and carboxylic acids (e.g., trichloroacetic acid, fluoroacetic acid). Suitable metal salt catalysts include, for example, magnesium bromide, aluminum nitrate, and zinc nitrate. The curing rate of the resin compositions of the invention depends on the cure temperature, and on the concentration and structure of the catalyst. Therefore, the amount of catalyst used will vary, but should be sufficient to catalyze the desired crosslinking reaction under the cure conditions selected. In general, the resin composition preferably contains an amount of catalyst within the range of about 0.05 to 1.0 parts catalyst per 100 parts of binder (binder = linear polyester diol + aminoplast).

An organic solvent may be blended with the resin composition of this invention to reduce the viscosity of the uncured composition and to provide a volatile vehicle for the resin composition. Preferably, the organic solvent does not interfere with the crosslinking reaction during curing. The proportion of organic solvent to binder is not critical, but the amount of solvent used will usually be within the range of about 20 and 55 weight percent in the coating composition. Useful solvents for the resin compositions of this invention are any of the usual volatile organic solvents used in paints and coatings. Suitable solvents include, but are not limited to: aromatic hydrocarbons such as toluene and xylene; ketones such as methyl ethyl ketone and isophorone; alcohols such as butanol and 2-ethyl hexanol; glycol ethers such as propylene glycol methyl ether and ethylene glycol ethyl ether; and glycol esters such as propylene glycol mono-acetate and ethylene glycol diacetate. Mixtures of solvents may be advantageously employed.

A pigment may be incorporated into the resin composition to impart color or opacity to the final cured coating. A preferred pigment is titanium dioxide, but any other suitable pigment may also be used. Examples of such pigments include, but are not limited to: zinc oxide, bentonite, silica, chrome yellow, chrome orange, chrome green, ferric oxide, ocher, and the like. The amount of pigment used will depend on the appearance desired; typically a ratio of pigment to resin composition within the range of about 0.6 to 1.3 is preferred. A leveling agent or flow-control agent such as an acrylic flow-modifying resin may also be added to the resin composition to optimize coating appearance.

The resin compositions of the invention can be applied to any suitable substrate, including, for example, paper, leather, wood, plastic, cloth, or (most preferably) metal. The compositions are particularly useful for coating steel, (especially steel coil), aluminum, copper, tin-plated steel, electro-galvanized steel, hot-dipped galvanized steel, and the like. Such metal substrates may be cleaned and/or chemically treated to enhance the wetting and adhesion of the applied coating. The resin compositions of the invention are equally useful as primers or top coats in combination with either the same or different types of coating compositions.

The resin compositions of this invention may be applied to a substrate using any of the usual methods of coating application including, but not limited to, spraying, direct-roll coating, reverse-roll coating, electrodeposition, flow coating and the like. The compositions are cured by heating the coatings after application for a time and at a temperature sufficient to substantially crosslink the linear polyester diol and the aminoplast. Typically, cure is achieved by heating at 120° to 350° C. for between 5 seconds and 30 minutes. The resin composition may be applied to a preheated substrate for a more rapid cure.

Without further elaboration, it is believed that one skilled in the art can, using the preceding description, fully utilize the present invention. The following examples are provided illustrate, not limit, the invention. The properties of the cured resin compositions described in the examples were evaluated using the test methods described in ASTM D3794.

EXAMPLES

Example 1

A 1 liter reaction flask was charged with 146.7 grams 2-methyl-1,3-propanediol, 221.7 grams isophthalic acid, 31.6 grams adipic acid and 0.141 grams hydrated monobutyl tin oxide ("FASCAT 4100" catalyst, a product of M&T Chemicals). The contents were heated to 210° C. and maintained at this temperature while water was continuously removed through a packed distillation column which was held at 105° C. The acid number was periodically determined. When the acid number reached a value of 8.5 milligrams KOH per gram resin, the heating was discontinued. "AROMATIC 150" solvent (a product of Exxon) was added to the polyester as it cooled; the resulting solution was further diluted to 62% solids with propylene glycol methyl ether acetate ("ARCOSOLV PMAc" solvent, a product of ARCO Chemical Co.). The final ratio of "AROMATIC 150" solvent to "ARCOSOLV PMAc" solvent was 3/1. The diluted product had a final acid number of 6.5 milligrams KOH per gram, a hydroxyl number of 22.6 milligrams KOH per gram, a Gardner-Holdt viscosity of Z4 and a Gardner color of <1.

The polyester solution was combined with 10% hexamethoxy-methyl-melamine ("CYMEL 303" curing agent, a product of American Cyanamid) based upon dry polyester and pigmented with titanium dioxide ("TITANOX 2090" pigment, a product of NL Chemicals) at a pigment to binder (polyester+aminoplast) ratio of 1:1. This composition was diluted to, 65 weight percent solids with "ARCOSOLV PMAc" solvent and combined with sufficient 25% p-toluenesulfonic acid in isopropanol to yield a 0.5 weight % catalyst concentration. Flow-control additive (0.02% "FLUORAD FC-430", a product of 3M Corp.) was also added. This formulation was drawn down on a "BONDERITE 1000" (a product of Henkel Corp.) treated cold rolled steel panel (available from Parker-Amchem) with a wire wound rod and cured at 245° C. for 75 seconds. The 1.0-mil thick coating exhibited +200 MEK double rubs resistance, 4H pencil hardness, 48 Sward hardness and a 60° gloss of 85. The coating passed a 0-T Bend test with no loss of adhesion or cracking after 30 minutes in an oven at 200° F. or after 5 minutes submersion in hot water (190°–200° F.). In addition, the coating exhibited a Gardner impact resistance of 160 in/lbs for direct and indirect impact.

The high hardness and exceptional flexibility of the coating are attributed to the composition of the polyester employed, which had a high isophthalic acid and 2-methyl-1,3-propanediol content. In addition, the coating displayed exceptional stain resistance. Four staining agents (mustard, ketchup, shoe polish and lipstick) failed to stain the coated panels.

Example 2–9

Table 1 lists additional examples of linear polyesters which were prepared by methods similar to those described in Example 1.

Example 10

The linear polyester of Example 2 was combined with 13.7% hexamethoxymethylmelamine on polyester, titanium dioxide (to give a pigment to binder ratio of 1:1) and PMAc to yield a coating composition with 65 weight % solids. The composition was combined with a 25% solution of p-toluenesulfonic acid in isopropanol (0.05% acid on binder) and 0.02% on binder flow-control additive ("FLUORAD FC-430"). The resulting composition was applied to a cold rolled steel panel and cured at 245° C. for 75 seconds. The dry coating thickness was 1.0 mil. The coating had a pencil hardness of 5H, a Sward hardness of 44, a 60-degree gloss of 99, and a +200 MEK double rubs resistance. The coating displayed a 0-T bend and passed a 160 in/lbs direct and indirect impact test.

Example 11

The linear polyester of example 3 was combined with 12.5% hexamethoxymethylmelamine (12.5%), titanium dioxide, PMAc, catalyst and "FLUORAD FC-430" flow-control additive. The pigment to binder level was 1:1 and the final solids level was 65%. Catalyst (25% p-toluenesulfonic acid in isopropanol) and flow additive were present at levels of 0.5% and 0.02% on binder respectively. The coating was cured as in Example 1 and yielded a resilient 1.0-mil film. The cured coating exhibited +200 MEK double rubs, a Sward hardness of 52, a pencil hardness of 4H, a 60-degree gloss of 92, a 160 in/lbs reverse impact and a 160 in/lbs direct impact resistance. Additionally, the coating exhibited a 0-T bend with no failure upon heating to 200° F. for thirty minutes.

Example 12

The linear polyester of example 5 was combined with 12.5 weight percent hexamethoxymethylmelamine, titanium dioxide (to give a pigment to binder ratio of 1:1) and PMAc such that the final weight percent solids was 65%. The composition was combined with a 25% solution of p-toluenesulfonic acid in isopropanol (0.5 wt. % on binder) and further treated with "FLUORAD FC-430" flow-control additive (0.02% on binder). The coating was cured at 240° C. for 125 seconds and yielded a 0.9 mil film with a 2H pencil hardness, a 60-degree gloss of 87, and which passed an 0-T bend test and 160 in/lbs direct impact and reverse impact tests.

Comparative Example 13

Isophthalic acid (58.77 wt. %) propylene glycol (32.79 wt. %) and adipic acid (8.78 wt. %) were charged into a reactor and esterified as in Example 1. The polyester had a final acid number of 9 mg KOH/gram polyester. This polyester was combined with 13.7% hexamethoxymethylmelamine, titanium dioxide, PMAc, p-toluenesulfonic acid and ("FLUORAD FC-430") flow control additive. The pigment to binder ratio was 1:1, the final solids level was approximately 65%; the catalyst to binder ratio was 0.5%, and the flow additive level was 0.02 wt. percent of the binder.

The coating was applied to a panel of "BONDERITE 1000"-treated cold rolled steel and cured at 245° C. for 45 seconds. The resulting 1.0-mil film had a pencil hardness of 5H, a Sward hardness of 54 and a 60-degree gloss of 99. However, the film exhibited very poor flexibility. The best fabrication T-bend test which this film passed was a 6-T bend. Such poor flexibility is often observed using high cyclic diacid content polyesters. The 2-methyl-1,3-propanediol based polyesters of this invention with high cyclic diacid content yield cured coatings having much greater flexibility.

Comparative Example 14

Isophthalic acid (50.44 wt. %), neopentyl glycol (40.10 wt. %), and adipic acid (9.46 wt. %) were charged into a reaction kettle and esterified as in Example 1. However, upon completion of the polyesterification and dilution with solvent, the mixture started to become heterogeneous. Within 12 hours, the polyester had crystallized and precipitated. Such crystallizable polyesters are not suitable for coating applications.

This example demonstrates the potential drawbacks of using high levels of isophthalic acid in polyester coating resins, namely, polyester crystallinity and short shelf life. Such problems do not occur when significant levels of 2-methyl-1,3-propanediol are incorporated into the linear polyester in accordance with the present invention.

Examples 15–18

Linear Polyester Diols from Isophthalic Acid and 2-Methyl-1,3-Propanediol

Polyester diols from isophthalic acid and 2-methyl-1,3-propanediol were formulated and cured using the procedure of Example 1. The formulations and coating properties are summarized in Table 2. The results clearly illustrate the superior hardness and flexibility of coatings derived from isophthalic acid/2-methyl-1,3-propanediol based polyesters that have isophthalic acid contents greater than about 40 mole percent. All of the samples had excellent flexibility (0-T) but the coatings prepared at isophthalic acid contents of 42 or 45 percent had far superior Sward and pencil hardnesses. At 24–35 mole percent isophthalic acid content (the range of isophthalic acid content illustrated in the branched polyester polyols of Japanese Kokai 59-91118) the linear polyesters exhibited poor hardness properties. We found that linear polyesters having excellent hardness could be prepared by increasing isophthalate level, and surprisingly, that the increase in isophthalate content did not adversely affect solvent compatibility.

TABLE 1

| | POLYESTER COMPOSITIONS (WT.) | | | | | | |
|---|---|---|---|---|---|---|---|
| | Components | | | | | Properties | |
| Example Number | 2-Methyl-1,3-Propanediol | Other Glycol | Adipic Acid | Isophthalic Acid | Other Diacid | Acid[5] Number | Hydroxyl[6] Number |
| 1 | 36.68 | — | 7.90 | 55.42 | — | 6.5 | 23 |
| 2 | 36.68 | — | 7.90 | 55.42 | — | 10.5 | 34 |
| 3 | 33.51 | 3.72[1] | 7.83 | 54.94 | — | 7.6 | 26 |
| 4 | 36.29 | — | — | 63.71 | — | 7.8 | 28 |
| 5 | 36.68 | — | 7.83 | 27.71 | 27.71[2] | 6.8 | 31 |
| 6 | 36.78 | — | 9.99 | 53.23 | — | 5.5 | 26 |
| 7 | 40.00 | — | 9.99 | 50.01 | — | 7.1 | 32 |
| 8 | 36.75 | — | — | 53.30 | 9.95[3] | 4.0 | 26 |
| 9 | 30.00 | 7.84[4] | 9.99 | 52.17 | — | 4.2 | 32 |

[1]2-Methyl-1,3-Pentanediol
[2]Terephthalic Acid
[3]Phthalic Anhydride
[4]Neopentyl Glycol
[5]mg KOH/g Resin
[6]mg KOH/g Resin

TABLE 2

| Linear Polyester Diols from Isophthalic Acid (IPA) and 2-Methyl-1,3-propanediol (MPD) | | | | |
|---|---|---|---|---|
| Example # | 15 | 16 | 17 | 18 |
| Formulation (g) | | | | |
| 2-Methyl-1,3-propanediol | 376.9 | 370.9 | 366.7 | 364.7 |
| Isophthalic acid | 331.5 | 469.3 | 554.2 | 590.2 |
| Adipic acid | 291.6 | 159.8 | 79.1 | 45.1 |
| Mole % MPD | 51 | 51 | 51 | 51 |
| Mole % IPA | 24 | 35 | 42 | 45 |
| Coating Properties | | | | |
| Sward Hardness | 0 | 12 | 48 | 40 |
| Pencil Hardness | B | 3H | 4H | 4H |
| T-Bend | 0-T | 0-T | 0-T | 0-T |

I claim:

1. A thermosettable resin composition suitable for forming a coating of improved hardness and flexibility, said thermosettable resin composition comprising:
   (a) a linear polyester diol consisting essentially of (i) from about 40 to 55 mole percent of recurring units of isophthalic acid; (ii) from about 45 to 60 mole percent of recurring units of an aliphatic diol, wherein from about 75 to 100 mole percent of the aliphatic diol recurring units are recurring units of 2-methyl-1,3-propanediol; and (iii) optionally, from about 0 to 15 mole percent of recurring units of a dicarboxylic acid other than isophthalic acid; wherein the linear polyester diol has a combined acid and hydroxyl number of from about 15 to 75 milligrams of potassium hydroxide per gram of linear polyester diol, and a number average molecular weight within the range of about 1000 to 7500;

(b) an amount of an aminoplast effective to crosslink the resin composition; and (c) an amount of a catalyst sufficient to catalyze a reaction between the linear polyester diol and the aminoplast.

2. The resin composition of claim 1 wherein the linear polyester diol consists essentially of from about 45 to 50 mole percent of isophthalic acid recurring units, from about 50 to 55 mole percent of aliphatic diol recurring units, and optionally, from about 0 to 5 mole percent of recurring units of a dicarboxylic acid other than isophthalic acid.

3. The resin composition of claim 1 wherein 100 mole percent of the aliphatic diol recurring units are 2-methyl-1,3-propanediol recurring units.

4. The resin composition of claim 1 wherein the aminoplast is a melamine derivative having at least four

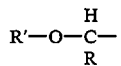

groups attached to the amino groups of the melamine structure, wherein R is hydrogen or a $C_1$–$C_5$ alkyl group, and R' is a $C_1$–$C_6$ alkyl group.

5. The resin composition of claim 1 wherein the aminoplast is hexamethoxymethyl melamine.

6. The resin composition of claim 1 comprising an organic solvent.

7. The resin composition of claim 1 comprising a pigment.

8. A substrate having a coating of a cured resin composition of claim 1.

9. A process for producing a coating of improved flexibility and hardness comprising (a) applying the thermosettable resin composition of claim 1 to a substrate; and (b) heating the thermosettable resin composition for a time and at a temperature sufficient to accomplish substantial crosslinking of the linear polyester and the aminoplast.

10. A thermosettable resin composition suitable for forming a coating of improved hardness and flexibility, said thermosettable resin composition comprising:

(a) a linear polyester diol consisting essentially of: (i) from about 40 to 55 mole percent of recurring units of isophthalic acid; and (ii) from about 45 to 60 mole percent of recurring units of 2-methyl-1,3-propanediol, wherein the linear polyester diol has a combined acid and hydroxyl number of from about 15 to 75 milligrams of potassium hydroxide per gram of linear polyester diol, and a number average molecular weight within the range of about 1000 to 7500;

(b) an amount of an aminoplast effective to crosslink the resin composition; and (c) an amount of a catalyst sufficient to catalyze reaction of the linear polyester diol and the aminoplast.

11. The resin composition of claim 10 comprising an organic solvent.

12. The resin composition of claim 10 comprising a pigment.

13. A substrate having a coating of a cured resin composition of claim 10.

14. A thermosettable resin composition for forming a coating of improved hardness and flexibility, said thermosettable resin composition comprising:

A. between 65 and 99 weight % of a polyester comprising the condensation reaction product of the following reactants:

a) from about 45 to 60 mole percent of an aliphatic diol mixture, wherein said aliphatic diol mixture is comprised of neopentyl glycol and at least about 75 mole percent 2-methyl-1,3-propanediol; and b) from about 40 to 55 mole percent of a dicarboxylic acid mixture, wherein said dicarboxylic acid mixture is comprised of from about 75 to 100 mole percent total of isophthalic acid and terephthalic acid;

wherein said polyester has a combined acid and hydroxyl number of from about 15 to 75 milligrams of potassium hydroxide per gram of polyester and a number average molecular weight of from about 1000 to 7500; and B. between 1 and 35 weight % of an aminoplast crosslinking agent.

15. The thermosettable resin composition of claim 14 wherein said composition is comprised of between 80% and 95% said polyester and between 5% and 20% said aminoplast crosslinking agent.

16. The thermosettable resin composition of claim 14 wherein the aliphatic diol mixture contains an additional aliphatic diol selected from the group consisting of ethylene glycol, 1,3-propanediol, 1,4-butanediol, 1,4-cyclohexane-dimethanol, diethylene glycol and 1,6-hexanediol.

17. The thermosettable resin composition of claim 16 wherein the additional aliphatic diol is 1,6-hexanediol.

18. The thermosettable resin composition of claim 14 wherein the dicarboxylic acid mixture additionally contains up to about 25 mole percent of a linear aliphatic dicarboxylic acid.

* * * * *